United States Patent
Lahijani

(10) Patent No.: US 7,985,447 B2
(45) Date of Patent: Jul. 26, 2011

(54) PROCESS FOR ROTOLINING THE INTERIOR SURFACE OF AN OIL PIPE

(75) Inventor: Jacob Lahijani, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/424,919

(22) Filed: Apr. 16, 2009

(65) Prior Publication Data
US 2009/0202715 A1    Aug. 13, 2009

Related U.S. Application Data

(60) Division of application No. 11/708,265, filed on Feb. 20, 2007, now Pat. No. 7,537,815, which is a continuation of application No. 10/872,629, filed on Jun. 21, 2004, now abandoned, which is a continuation-in-part of application No. 10/719,162, filed on Nov. 21, 2003.

(60) Provisional application No. 60/431,391, filed on Dec. 6, 2002.

(51) Int. Cl.
*B05D 7/22* (2006.01)
*B05D 3/02* (2006.01)
*B05D 3/12* (2006.01)

(52) U.S. Cl. ............ 427/231; 427/195; 427/205

(58) Field of Classification Search .......... 427/183, 427/189–192, 195, 201–203, 205, 231; 118/DIG. 10, DIG. 13
See application file for complete search history.

(56) References Cited

U.S. PATENT DOCUMENTS

| | | | |
|---|---|---|---|
| 4,312,961 A | | 1/1982 | Winegar et al. |
| 5,397,831 A | * | 3/1995 | Saito et al. ............ 524/502 |
| 5,760,151 A | | 6/1998 | Aten et al. |
| 5,981,673 A | | 11/1999 | DeSimone et al. |
| 6,287,632 B1 | | 9/2001 | Nishio et al. |
| 6,632,902 B2 | | 10/2003 | Lahijani |
| 2004/0204536 A1 | | 10/2004 | Miyatani et al. |
| 2005/0173012 A1 | * | 8/2005 | McKeen ............ 138/146 |

FOREIGN PATENT DOCUMENTS

| | | |
|---|---|---|
| EP | 0 266 668 B1 | 1/1992 |
| EP | 1 031 384 A2 | 8/2000 |
| EP | 1 188 808 A1 | 3/2002 |
| JP | 03-207474 A * | 9/1991 |
| JP | 2904593 B2 | 9/1992 |

OTHER PUBLICATIONS

John Scheirs, Modern Fluoropolymer, (1997), pp. 314-315, John Wiley & Sons, England.

\* cited by examiner

*Primary Examiner* — William Phillip Fletcher, III

(57) ABSTRACT

A process is provided for rotolining the interior surface of an oil pipe having an inner diameter of at least 2 in (5.1 cm) and no greater than 6 in (15.2 cm) and length of at least 10 ft (3 m), comprising introducing particles of rotolining composition comprising fluoropolymer and no greater than 2 wt % of metal powder into the interior of said pipe, heating the pipe to a temperature above the melting temperature of the fluoropolymer, rotating the pipe around its longitudinal axis during the heating and rocking the pipe end-to-end thereof during the rotating so as to distribute the composition over the entire interior of the pipe, the combination of heating and distributing causing the particles to melt and coalesce to form a rotolining on the pipe over its entire interior.

5 Claims, No Drawings

PROCESS FOR ROTOLINING THE INTERIOR SURFACE OF AN OIL PIPE

CROSS REFERENCES TO RELATED APPLICATIONS

This application is a divisional of Ser. No. 11/708,265, filed Feb. 20, 2007, now U.S. Pat. No. 7,537,815, which is a continuation of Ser No. 10/872,629, filed Jun. 21, 2004, abandoned, which is a continuation-in-part of Ser No. 10/719,162, filed Nov. 21, 2003, which claims the benefit of 60/431,391, filed Dec. 6, 2002.

BACKGROUND OF THE INVENTION

1. Field of the Invention

This invention relates to fluoropolymer compositions and to the use of such compositions for rotolining of the interior surface of a hollow article.

2. Description of Related Art

J. Scheirs, Modern Fluoropolymers, John Wiley & Sons (1997) describes the rotolining process, which involves the adding of sufficient fluoropolymer in powder form to a steel vessel to coat the interior surface of the vessel with the desired thickness of the fluoropolymer, followed by rotating the vessel in three dimensions in an oven, to melt the fluoropolymer, whereby the fluoropolymer covers the interior surface of the vessel and forms a seamless lining (p. 315). The resultant fluoropolymer lining protects the vessel from corrosive materials stored or handled by the vessel, by virtue of the chemical inertness of the fluoropolymer forming the lining and the lining being continuous with respect to the interior surface of the vessel that would be exposed to the corrosive materials if the lining were not present. Thus, the lining is free of holes, even pinholes, through which the corrosive material could penetrate the lining to attack the material of construction of the vessel.

J. Scheirs also clarifies the relationship between the vessel and the fluoropolymer lining. For some fluoropolymers, notably copolymer of ethylene with either tetrafluoroethylene (ETFE) or chlorotrifluoroethylene (ECTFE) and polyvinylidene fluoride (PVDF), the lining adheres to the interior surface of the vessel, while for the perfluorinated melt processible polymers, tetrafluoroethylene/hexafluoropropylene (FEP) and tetrafluoroethylene/perfluoro(alkyl vinyl ether) (PFA), such polymers form only a loose lining within the vessel (p. 314). The PFA available for rotolining has been tetrafluoroethylene/perfluoro(propyl vinyl ether). The loose lining is held in place by the configuration of the interior surface of the vessel, i.e. mechanically locked into place, to provide the necessary protection to the vessel. The reason why the lining is loose arises from the high shrinkage of the perfluorinated polymer when the lined vessel is cooled from the rotolining operation, the shrinkage of PFA even exceeding that of FEP, causing the lining to separate from the interior surface of the vessel. While this is satisfactory in some applications, the lack of adhesion between lining and interior surface of the vessel becomes disadvantageous in such vessels as pipes, wherein the opportunity for mechanical restraint on movement of the lining is limited, especially as the length of the pipe increases. The passage of corrosive material, such as oil through the pipe, especially when the flow of the material varies, subjects the lining to mechanical stress, which can cause the lining to crack and fail.

Japanese Patent 2904593, first published as Kokai H4-267744 on Sep. 24, 1992, discloses the rotolining of a vessel using PFA fluororesin which bubbles during rotolining and solves the bubbling problem by adding from 0.1 to 30 wt % of a fine powder, disclosing inorganic powder or metal powder such as glass, silicon, zinc, aluminum, copper or the like, to the PFA. The preferred amount of the fine powder is 5 wt %, and the resultant lining is 2.0 mm (80 mils) thick. No effect on adhesion of the rotolined coating is disclosed. The effect of the fine powder is disclosed, however, viz. to cause the bubbles to adhere to the freely moving fine powder particles so as to be released to the outside, whereby the gas bubbles do not remain in the coating. The presence of the fine powder, however, causes another problem, namely that the fine powder can deposit on the surface of the coating to become a contaminant in the chemical stored in the vessel. The patent solves this problem by applying a rotolined second layer onto the lining (first layer), with the second layer being free of fine powder. The second layer is kept thinner than the first layer so that the formation of bubbles in the second layer is small, and the thickness of the second layer is disclosed to be 0.5-1.0 mm (20-40 mils).

The history of the development of PFA fluoropolymer is disclosed in U.S. Pat. No. 5,760,151 (1998), wherein the fluoropolymer referred to is copolymer of tetrafluoroethylene (TFE)/perfluoro(alkyl vinyl ether) (PAVE), wherein the alkyl group contains 1 to 8 carbon atoms. Up until the time of U.S. '151, the only commercially available PFA copolymer was the TFE/perfluoro(propyl vinyl ether) (PPVE) copolymer, and indeed, TFE/PPVE copolymer has been the only PFA fluoropolymer that has been used for rotolining. Consequently, the above mentioned references to Scheirs and Japanese Patent 2904593 are understood to refer to TFE/PPVE copolymer.

U.S. '151 discloses the discovery that TFE/perfluoro(ethyl vinyl ether) (PEVE) copolymer exhibits improved tensile properties (Example 8 and Control B) and faster extrudability (Example 9 and Control C) compared to TFE/PPVE copolymer. The surprisingly high extrudability of the TFE/PEVE copolymer at high shear rates (col. 3, I. 55-57) led to the commercialization and thus commercial availability of TFE/PEVE copolymer.

BRIEF SUMMARY OF THE INVENTION

The present invention finds that rotolining compositions of TFE/PPVE copolymer and certain metal powders present in small amounts in the composition adhere to the interior surface of hollow articles when applied to such surface in a rotolining process. It has been discovered, however, that the rotolining composition in which TFE/PEVE copolymer is used in place of the TFE/PPVE copolymer provides much better adhesion. The present invention, therefore is directed to the improved rotolining composition using TFE/PEVE copolymer and the use of this composition in the rotolining process.

Thus, the composition of the present invention comprises particles of tetrafluoroethylene/perfluoro(ethyl vinyl ether) (TFE/PEVE) copolymer and adhesion promoting, non-bubble promoting metal powder. Such composition can be the composition for obtaining a bubble-free, adherent rotolining or the lining itself. Some metal powders, such as aluminum metal powder, promote bubbling in the lining during its formation, and such powder is excluded from the present invention. Preferred metal powders that cause the TFE/PEVE copolymer to adhere to the surface to which it is applied, i.e. the interior surface of a hollow article, are the powders of zinc, tin, and copper or combinations thereof. These metal powders are used in small amounts, less than about 5 wt %, and preferably no greater than about 2 wt %.

The process of the present invention can be described as a process for rotolining the interior surface of a hollow article, comprising, adding a composition comprising particles of tetrafluoroethylene/perfluoro(ethyl vinyl ether) copolymer and adhesion-promoting, non-bubble promoting metal powder to the interior of said hollow article, heating said article while it is rotating to melt said copolymer particles to form a continuous lining of said composition on said interior surface, cooling said article, and obtaining as a result thereof said lining adhering to said surface.

Another aspect of the present invention is the composition of the lining (coating, film, or sheet) formed from the composition of the present invention by the melting and cooling of the composition (copolymer) thereof, such as by the rotolining process of the present invention.

DETAILED DESCRIPTION OF THE INVENTION

The process steps of rotolining are conventional. Thus, it is understood that the hollow interior of the article is sealed after the composition is added to the hollow interior and prior to the start of the rotation step. Typically the interior surface of the hollow article being lined will be made of carbon steel or stainless steel. The present invention resides in the compositions used in rotolining and in particular the combination of the TFE/PEVE and metal powder as the rotolining composition.

EP 0 226 668 B1 discloses the preparation of rotolining particles of TFE/perfluoroalkyl vinyl ether (PAVE) in which the vinyl ether comonomer contains 3 to 8 carbon atoms, disclosing particularly perfluoro(methyl vinyl ether), perfluoro(propyl vinyl ether), and perfluoro(heptyl vinyl ether), TFE/PPVE copolymer being the copolymer used in the Examples. The particles of copolymer are prepared by solvent aided-pelletization, which involves forming a gel of an aqueous dispersion of the copolymer, mechanically agitating the gel in the presence of water immiscible liquid to form granules, followed by drying the granules. The resultant granules have an average particle size of 200 to 3000 µm and have a substantially spherical shape as indicated by a sphere factor of less than 1.5. The particles of TFE/PEVE copolymer used in the present invention can be the granules disclosed in EP 0 226 668 and having the same particle size and spherical shape, with these characteristics being determined as disclosed in the publication. The copolymer particles can also be heat hardened, by heating the particles to a temperature below the below the onset of melting, so as to avoid melting of the particles, for a sufficient time to harden the particles so as to be free flowing. The heat hardening is characterized by the particles exhibiting an attrition factor of at least 60 as disclosed in EP 0 226 668. The TFE/PEVE copolymer particles used in the present invention can also be made by other processes, for example the melt extrusion of the copolymer and cutting of the extrudate into minicubes as disclosed in U.S. Pat. No. 6,632,902, wherein the average particle size of the cubes is 200 to 1200 µm. The average particle size of the copolymer particles used in the present invention is preferably about 100 to 3000 µm, more preferably about 400 to 1100 µm.

The copolymer itself will typically be made by aqueous dispersion copolymerization of tetrafluoroethylene with perfluoro(ethyl vinyl ether). The resultant copolymer is formed as fine particles in the aqueous dispersion medium, these fine particles having an average particle size of about 0.2 µm, which is often called the primary particle size. The copolymer particles used in the process of the present invention are generally secondary particles in the sense of being agglomerates of primary particles when prepared by the pelletizing (granulating) process of EP 0 226 668 When the particles are made by extrusion/cutting, they too are larger than the original primary particles.

The copolymer will contain sufficient PEVE comonomer units to make the copolymer melt flowable, e.g. exhibiting a melt flow rate (MFR) at 372° C. of about 1 to 50 g/10 min, as determined by the procedure disclosed in ASTM D 3307, more preferably about 2 to 30 g/10 min. Copolymers having these MFR exhibit adequate flow in the molten state to convert the copolymer particles to a continuous lining and for the lining to have sufficient toughness to withstand the thermal and mechanical shocks associated with the use of the rotolined article. Thus the copolymer will contain about 1 to 18 wt % PEVE, preferably 3 to 12 wt % PEVE, based on the total weight of the copolymer. Small amounts of other comonomer can be present to modify properties of the copolymer, but in lesser amounts than the PEVE content. The copolymer may be partially crystalline or amorphous. It is preferably partially crystalline. By partially crystalline is meant that the copolymer has some crystallinity and is characterized by a detectable melting point measured according to ASTM D 3418, and a melting endotherm of at least about 3 J/g. Melt-processible polymers that are not crystalline according to the preceding definition are amorphous. Amorphous polymers include elastomers, which are distinguished by having a glass transition temperature of less than about 20° C. as measured according to ASTM D 3418.

As described in EP 0 226 668, the copolymer as-polymerized has unstable end groups which on heating can decompose to volatile product, such as $CO_2$ and HF, which cause bubbles and voids in rotolinings. In this publication, the copolymer is stabilized by exposing the copolymer particles to fluorine for a sufficient time to reduce the unstable end group population in the copolymer to less than about $80/10^6$ carbon atoms present in the copolymer. This fluorine treatment can be used on the copolymer particles used in the present invention to reach the same endpoint, less than about 80 unstable end groups/$10^6$ carbon atoms, preferably less than about 50, more preferably, less than about 10, and even more preferably less than about 3 unstable end groups/$10^6$ carbon atoms. Examples of unstable end groups are —COOH, —CONH$_2$, —CH$_2$OH, —CO$_2$CH$_3$, —CF=CF$_2$, and —COF. The exposure of these end groups to fluorine converts these unstable end groups to the very stable —CF$_3$ end groups. The analysis for unstable end groups is disclosed in EP 0 226 688.

The TFE/PEVE copolymer used in the rotolining composition of the present invention can stabilized as described above or can be as-polymerized, i.e. containing a total of at least about 400 unstable end groups/$10^6$ carbon atoms, which is the result of polymerization carried out using an inorganic salt, such as potassium persulfate, to form a copolymer characterized by the MFR described above. The copolymer can also be partially stabilized, such as by fluorine treatment but to a lesser extent than to form stabilized copolymer. For the purposes of simplicity, copolymer having at least about 80 unstable end groups/$10^6$ carbon atoms, i.e. including as-polymerized and partially stabilized, is considered as being unstabilized.

The TFE/PEVE copolymer is made to adhere to the interior surface of the hollow article by the copolymer being used to form the lining being a composition comprising the copolymer and adhesion promoting, non-bubble promoting metal powder. Preferred metal powders are the powders formed from or containing zinc, tin, or copper or combinations thereof. Examples of combinations of the metal powders are mixtures and alloys thereof. Examples of alloys include Cu/Zn (brass) and Cu/Sn (bronze). Some powder additives, such as aluminum or aluminum oxide cause bubbling in the rotolining composition during the rotolining process, and are therefore unsuitable. The metal powder component of the rotolining composition is in the form of a powder, typically having an particle size no greater than about 100 µm, preferably less than about 60 micrometers. It is unnecessary for the powder particles to be less than 1 micrometer. Consequently at least about 75 wt % and preferably at least about 90 wt % of the metal powder particles will have a particle size in the range of about 1 to 100 µm. The metal powder can simply be mixed with the particles of stabilized or unstabilized copolymer to form the composition added to the interior of the hollow article to be rotolined. The mixing of the metal powder with the copolymer is done after the fluorination treatment, when used, so that the fluorine does not react with the metal powder. The TFE/PAVE minicubes of U.S. Pat. No. 6,632,902 are preferably fluorinated to form stable copolymer, and indeed the copolymers used in the Examples, unless otherwise indicated, are all fluorinated to form stable copolymer.

The melt density of the TFE/PEVE copolymer is 1.74 g/cc and the density of the copolymer after cooling to room temperature is 2.15 g/cc, regardless whether the copolymer is stabilized or not. This large difference in densities between the molten and solid states indicates a large shrinkage upon cooling the rotolining from the melt, which is why the copolymer lining does not adhere to the interior surface of the hollow article even when the interior surface is roughened such as by grit blasting. Surprisingly, a small amount of the metal powder intermixed with the copolymer particles is sufficient to cause the lining to adhere to the interior surface, preferably achieving a peel strength of at least about 25 lb/in (4.4 kN/m). The amount of such metal powder is at least about 0.2 wt %, preferably about 0.3 to 1.2 wt %, more preferably about 0.4 to 1.0 wt %. Weight % s disclosed herein are based on the total weight of the copolymer/metal powder composition. Insufficient amounts of metal powder do not give the adhesion desired and as the amount of metal powder exceeds about 1.2 wt %, no further appreciable improvement in adhesion is obtained. Instead, adhesion diminishes and the toughness of the lining diminishes as well.

The lining can have a thickness of at least about 30 mils (0.75 mm), preferably at least about 50 mils (1.25 mm), such as up to about 1000 mils (25 mm), although thicknesses of about 50 to 100 mils (1.25-2.5 mm) are preferred. The thickness of the lining is the thickness of the thinnest point of the lining. Interior surfaces to be rotolined that have planar surfaces tend to receive rotolinings with thinner regions near the center of the planar surface, while cylindrical interior surfaces tend to receive rotolinings of uniform thickness The presence of the metal powder in the rotolining composition enables the rotolining process to form a smooth bubble-free lining, whether the TFE/PEVE copolymer is stabilized or unstabilized. By smooth is meant that craters or voids or lumps are not present in or at the surface of the lining. Lumps are encapsulated bubbles that protrude from the exposed surface of the lining. The absence of voids also indicates that the lining forms a continuous coating on the interior surface of the hollow article being rotolined. By bubble-free is meant that bubbles are not visible to the naked eye in the lining and the residue of bubbles, voids or craters are not visible either.

Surprisingly, the rotolining composition containing TFE/PEVE copolymer and metal powder adheres much more strongly to the interior surface of the hollow article being subjected to the rotolining process than does the corresponding composition containing TFE/PPVE copolymer.

Surprisingly, the adhesion obtained using the unstabilized copolymer is greater than that obtained for the stabilized copolymer using the same metal powder adhesion promoter in the same amount.

The presence of the small amount of metal powder in the rotolining composition and its resultant containment in the lining formed from the composition by the rotolining process enables the lining to be used as a single layer coating on the interior surface of the hollow article, without concern that the metal powder will contaminate the fluid to be contained (transferred through or maintained within) the hollow article. The metal powder does not migrate to the lining surface during the rotolining process, and if the powder did so migrate, then it could not bring about adhesion of the lining to the surface. Instead, the metal powder is dispersed in the lining formed from the rotolining process.

In applications where extreme purity is required for the contained fluid, an overcoat consisting of perfluoro(alkyl vinyl ether) copolymer, i.e. free of metal powder, is applied by rotolining process to the lining described above. The alkyl group can contain 1 to 8 carbon atoms. While the alkyl group of the copolymer is required to be PEVE in the lining (undercoat) in order to obtain the adhesion advantage, the alkyl group in the overcoat copolymer is preferably perfluoro(methyl vinyl ether) (PMVE), PEVE or PPVE, all of which have sufficient chemical similarity to adhere to the undercoat. The overcoat copolymer is in particle form and can be characterized by the same parameters as for the copolymer particles used in the lining (undercoat) composition although the particle characteristics of the overcoat copolymer can be different from those of the lining (undercoat) copolymer. The overcoat copolymer need not be stabilized, but is preferably stabilized so as to provide the most chemically inert surface facing the fluid contained in the rotolined hollow article. The copolymer can be stabilized by fluorine treatment as described above. Alternatively, the copolymer can be stabilized as formed in a special copolymerization process, such as by the polymerization process disclosed in U.S. Pat. No. 5,981,673, wherein the copolymer as-formed, is formed with such stable end groups as perfluoroalkyl, perfluoroalkoxy, or perchloroalkyl.

The overcoat can be applied by the same rotolining process used to form the lining (undercoat), after the lining has cooled, i.e. the particles of stabilized or unstabilized copolymer are added to the interior of the already-lined hollow article and the hollow article is re-heated and rotated within the oven to cause the copolymer particles charged into the hollow interior of the article to form a coating over the TFE/PEVE copolymer/metal powder lining. The overcoat adheres to the undercoat by virtue of the similarity of the copolymer(s) in the overcoat and undercoat. This adhesion is such that there is no delamination between the over coat and undercoat after cooling and in use.

Preferably, the thickness of the overcoat is at least ⅔ the thickness of the undercoat and more preferably the thickness of the overcoat is greater than the thickness of the undercoat. The undercoat adheres to the interior surface of the hollow article, and the overcoat adheres to the undercoat, thereby forming a thick adherent perfluoropolymer overall lining on the interior surface of the hollow article. It is preferred that the overcoat has a thickness of at least about 1.5 mm (60 mils) and most preferably, at least about 2.5 mm (100 mils), and that the overall coating, undercoat plus overcoat, has a thickness of at least about 2.75 mm (110 mils) and more preferably, at least about 4 mm (160 mils). The overcoating may be thicker, e.g.

up to about 100 mm (4000 mils), and the overall layer thickness can also be thicker, e.g. up to about 125 mm (5000 mils). The undercoat can be thin relative to the thickness of the overcoat, because the undercoat need only form the anchor for the overcoat to form both the protective coating for the surface being rotolined and a chemically inert surface facing the contents present in the hollow article.

EXAMPLES

In the following Examples, the TFE/PEVE copolymer used is commercially available, characterized by an MFR of 15 g/10 min, and the TFE/PPVE copolymer used commercially available, is characterized by an MFR of 6 g/10 min. Each copolymer is in the form of particles. The TFE/PEVE copolymer has an average particle size of 1000 μm and the TFE/PPVE copolymer has an average particle size of 475 μm. Each copolymer is as-polymerized and unstable. When metal powder is used, such powder has the fineness of talcum powder in which at least about 90 wt % of the particles have a particle size in the range of 2 to 40 μm. The rotolining composition used in the Examples is prepared by dry mixing this powder with the metal powder in the amount desired. The resultant composition (mixture) is added to the mold to be rotolined in the amount to obtain the lining thickness desired. The mold is in the form of a flat rectangular box resembling a book, in which two major opposing interior surfaces are the test panels of substrate to be lined, and the remaining minor interior surfaces comprise the frame holding the two test panels in place and forming the enclosure required for the rotolining to occur. The mold is rotated on multiple axes while present in an air oven supplying the heat necessary to melt the copolymer particles, resulting in the interior surface of the mold, including the two test panels, becoming lined with the composition. Upon completion of the rotolining process, the oven is cooled and the rotolined test panels are separated from the mold for observation of the quality of the rotolining. When the rotolining on the test panels has the appearance of adhesion, i.e. the lining is adhered to the edges of the test panel and the test panel is bowed by virtue of the lining shrinking more than the test panel during the cooling of the mold, the peel strength of the adhesion of the lining on the test panel is determined in accordance with the procedure of ASTM D 413. The bubble-free quality of the lining is determined by observation of the lining with the naked eye. The lining is considered bubble free when no bubbles are visible within the lining thickness and the surface of the lining is smooth, i.e. free of voids, lumps, and craters.

The process of the present invention can be used in general for rotolining the interior surface of hollow articles and wherein the interior surface can be made of a variety of different materials, such as carbon steel and stainless steel. The fact the present invention causes the lining to adhere to the interior surface, makes the practice of the present invention particularly valuable for lining pipe, including tubing. For pipe, the only mechanical interconnection between the lining and the pipe is the flanges at each end of the pipe. The longer the pipe between flanges, the greater is the mechanical stress imposed on the lining due to mechanical action of fluid or temperature change, especially rapid or abrupt temperature change, which can be injurious to the integrity of the lining when it is not adhered to the pipe interior surface. Flexure of the lining independent of the pipe interior surface can cause the lining to crack. Adhesion of the lining to the interior surface of the hollow article in general and to the interior surface of pipe in particular strengthens the lining, thereby maintaining its integrity and prolonging its life.

Example 1

A series of rotolinings were conducted at oven temperature of 740° F. (380° C.) for 120 min of mold rotation, in which the test panels are 304 stainless steel which has been grit blasted with a blend (16 grit) of alumina particles and glass beads and in which the amount of rotolining composition added to the mold is sufficient to form a lining 90 mils (2.3 mm) thick.

When the rotolining material consists solely of TFE/PEVE copolymer particles or TFE/PPVE copolymer particles, the resultant lining does not adhere to the interior surface of the mold, in particular to the test panels forming the major interior surface of the mold.

When the rotolining material is a composition of either copolymer plus 0.5 wt % zinc powder, the resultant linings adhere to the interior surface of the mold, but the adhesion of the TFE/PEVE copolymer-containing lining is substantially greater. The peel strength of the TFE/PEVE copolymer lining is 77.4 lb/in (13.55 kN/m), while the peel strength of the TFE/PPVE copolymer-containing lining is 34.77 lb/in (7.65 kN/m).

The adhesion advantage is even greater when the test panels of the mold are made of carbon steel, e.g. 1018 steel. The peel strength of the TFE/PEVE copolymer-containing lining is 96.2 lb/in (16.8 kN/m). The peel strength of the TFE/PPVE copolymer-containing lining is 44.3 lb/in (7.75 kN/m).

Similar results are obtained when the zinc powder is replaced by tin or copper powder. All linings are smooth and bubble-free.

Example 2

A series of rotolinings are conducted under the same parameters as Example 1 to compare stabilized TFE/PEVE copolymer with unstabilized TFE/PEVE copolymer. The stabilized TFE/PEVE copolymer particles are prepared by treating the particles of the copolymer with fluorine to obtain the copolymer having less than 10 unstable end groups per $10^6$ carbon atoms. Each rotolining composition contains 1 wt % of the zinc powder. For the carbon steel panels, the peel strength of the unstabilized copolymer-containing lining is 109 lb/in (19.16 kN/m), while for the stabilized copolymer-containing lining, the peel strength is 53 lb/in (9.28 kN/m). Both linings are smooth and bubble-free.

As the metal powder concentration is increased from 1 wt % for both copolymer compositions, the peel strength diminishes. At 5 wt % zinc powder concentration, the peel strength of the stabilized copolymer-containing lining drops to 14 lb/in (2.45 kN/m).

Example 3

The linings of Examples 1 and 2 are overcoated with stabilized TFE/PPVE copolymer which does not contain any metal powder by adding particles of the copolymer in sufficient amount to the interior of the lined mold to provide an overcoat thickness of 100 mils (2.5 mm). The rotolining temperature is 650° F. (343° C.), and the time of mold rotation is 180 min. The resultant overcoat adheres to the lining (undercoat) and is smooth and bubble-free.

Example 4

Example 4 is directed to the application of the present invention to pipes used in the production and transportation of oil. Such pipes are subject to corrosion and plugging. These pipes are generally large and for reasons of economy are manufactured from carbon steel rather than more expensive corrosion resistant alloys. Corrosion is induced by the hot underground environment in which down-hole pipes convey oil from deeply buried deposits to the earth's surface. Materials such as water, sulfur, sulfur dioxide, carbon dioxide, hydrogen sulfide, present in the oil typically make it acidic causing corrosion of the interior surface of the pipe. Even at cooler temperatures, transportation pipelines that extend for long distances close to the earth's surface experience the effects of corrosion because of the long contact times involved. Corroded pipes are difficult and expensive to replace.

Plugging occurs when organic materials soluble in the oil at high temperatures of the oil deposit become insoluble as the oil cools during the rise through a pipe to the earth's surface. The resultant insoluble materials, such as asphaltenes and paraffin waxes, tend to plate out on the interior surface of the pipe, restricting the oil flow and eventually plugging the pipe. Plugging also occurs during long distance conveying of the oil through pipelines. Plugging requires that production or transportation cease while the pipe is cleaned out either by mechanical scraping (pigging), chemical treatment or hot oiling. Such cleaning reduces productivity and involves large maintenance costs.

The pipe conveying oil (oil pipe) of the present invention is exemplified as may be used as a succession of such pipes in an oil transportation pipeline or a down-hole oil well pipeline. Such oil pipes are generally large having an inner diameter of at least 2 in (5 cm), preferably no greater than 6 in (15.2 cm) and a length of at least 10 ft (3 m), more often at least 20 ft (6.1 m) and often a length of at least 30 ft (9.1 m). The pipes are typically made from rigid metal, usually carbon steel for reasons of economy, and as such are prone to corrosive attack from acidic entities in the oil unless protected by a corrosion resistant coating. In this invention, a surface which is both corrosion resistant and which possesses good release characteristics is applied to the interior surface of the pipe. Beneficial effects are also seen for pipes that are made from other substrates such as aluminum, stainless steel and other corrosion resistant alloys.

The oil pipe of this invention has an interior surface rotolined with fluoropolymer as herein before described, the rotolining containing an effective amount of metal powder to cause the rotolining to adhere to the interior surface. Preferred metal powders that cause the rotolining to adhere to the interior surface of the pipe are powders of zinc, tin, and copper or combinations thereof. The metal powders are used in small amounts, as herein before described. In one embodiment the oil pipe has a single, thick layer of rotolined fluoropolymer containing metal powder and in an alternate embodiment, the rotolining comprises a primer layer of fluoropolymer containing metal powder adhered to the interior of the pipe and an overcoat of the fluoropolymer. The rotolining on the interior of the oil pipe (either as a single layer or as a primer/overcoat combination) preferably has a thickness of 30 mils (762 micrometers) to 250 mils (6350 micrometers), preferably 30 mils (762 micrometers)-100 mils (2540 micrometers). If present, the primer layer preferably has a thickness of at least 762 micrometers (30 mils) and the overcoat preferably has a thickness of 30 mils (762 micrometers) to 220 mils (5588 micrometers).

Thick linings are of particular benefit in these highly abrasive and severely corrosive environments. The lining is impermeable to the corrosive materials present in the oil and presents a nonstick surface to the oil, whereby the insoluble organic materials present in the oil do not stick and restriction of oil flow and plugging is avoided. Further the thick lining is able to provide insulation to the oil pipe to mitigate the change from hot underground conditions to cooler earth surface effects, thereby resisting the deposit of the insoluble organic materials.

A carbon steel pipe suitable for conveying oil having a diameter of 3 inches (7.6 micrometers) and a length of 30 feet (9 m) is cleaned by baking 30 min @800° F. (427° C.) and grit blasted with 40 grit aluminum oxide to a roughness of approximately 70-125 microinches Ra. The pipe is rotolined with a composition containing a commercially available copolymer of TFE/PPVE powder having an MFR of 6 g/10 min and an average particle size of 475 μm. The copolymer is stable as described above. The rotolining composition used in this example is prepared by dry mixing the copolymer powder with 0.5 wt % zinc powder. The resultant composition (mixture) is introduced to the interior of the pipe to be rotolined in the amount to obtain a lining thickness of 30 mils (762 micrometers). The pipe is temporarily closed at both ends and mounted on a mechanism that both rocks and rotates the pipe within in an air oven. The mechanism is commercially available as a Rock and Roll machine. The pipe is heated above the melting point of the copolymer particles and is rotated around its longitudinal axis during the heating while being rocked from end to end during the rotation at a temperature 740° F. (380° C.) for 120 min of pipe rotation. The pipe is rotated in an air oven resulting in lining the interior surface of the pipe with a coating of uniform distribution. Upon completion of the rotolining process, the oven is cooled and the rotolined pipe is examined for the quality of the rotolining. The temporary ends are removed from the pipe and the bubble-free quality of the lining is determined by observation of the lining with the naked eye. The lining is considered bubble free when no bubbles are visible within the lining thickness and the surface of the lining is smooth, i.e. free of voids, lumps, and craters.

For determining the adhesion quality, the coated pipe is sectioned and subjected to the PWA Test and the Cross-Hatch Adhesion Test.

For Post Boiling Water Fingernail Adhesion (PWA), a rotolined section of pipe is submerged in boiling water for 20 minutes. The water is allowed to come to a full boil after inserting the coated panel, before timing is begun. After the boiling water treatment, the section is cooled to room temperature and dried thoroughly. The fingernail scratch test involves the use of the fingernail, to chip or peel away the lining from the edge of a deliberate knife scratch in the film, to test the degree of adhesion of the lining. If the lining can be pulled away from the substrate for 1 cm or more, the lining is considered to fail the PWA test. If the lining cannot be pulled loose for a distance of 1 cm, the lining is considered to pass the PWA test. The pipe sections tested herein pass the PWA test.

For Cross-Hatch Adhesion a lined section of pipe is scribed with a razor blade with an "X". The lined and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. The sectioned pipe passes the test in that no lining is removed.

What is claimed is:

1. Process for rotolining the interior surface of an oil pipe having an inner diameter of at least 2 in (5.1 cm) and no greater than 6 in (15.2 cm) and length of at least 10 ft (3 m), comprising introducing particles of rotolining composition consisting essentially of fluoropolymer and no greater than 2 wt % of metal powder into the interior of said pipe, heating said pipe to a temperature above the melting temperature of said fluoropolymer, rotating said pipe around its longitudinal axis during said heating and rocking said pipe from end-to-end thereof during said rotating so as to distribute said composition over the entire interior of said pipe, the combination of said heating and said distributing causing said particles to melt and coalesce to form a bubble-free rotolining on said pipe over its entire interior.

2. Process of claim 1 wherein said rotolining is a primer.

3. Process of claim 2 comprising applying a rotolined overcoat on said primer rotolining, said rotolined overcoat comprising fluoropolymer but being free of said metal powder.

4. The process of claim 1 wherein the amount of said metal powder in said composition is 0.3 to 1.2 wt %.

5. The process of claim 1 wherein said oil pipe is downhole well pipe.

\* \* \* \* \*